(12) United States Patent
Syed et al.

(10) Patent No.: US 11,685,141 B2
(45) Date of Patent: Jun. 27, 2023

(54) FLEXIBLE CONDUCTIVE DEVICE

(71) Applicant: WOOTZANO LIMITED, Edinburgh (GB)

(72) Inventors: Atif Syed, Edinburgh (GB); Enrico Mastropaolo, Edinburgh (GB)

(73) Assignee: WOOTZANO LIMITED, Edinburgh (GB)

( * ) Notice: Subject to any disclaimer, the term of this patent is extended or adjusted under 35 U.S.C. 154(b) by 198 days.

(21) Appl. No.: 16/767,315

(22) PCT Filed: Nov. 27, 2018

(86) PCT No.: PCT/GB2018/053417
§ 371 (c)(1),
(2) Date: May 27, 2020

(87) PCT Pub. No.: WO2019/102227
PCT Pub. Date: May 31, 2019

(65) Prior Publication Data
US 2020/0406584 A1    Dec. 31, 2020

(30) Foreign Application Priority Data
Nov. 27, 2017   (GB) ...................... 1719697

(51) Int. Cl.
*B32B 3/00*     (2006.01)
*B32B 15/08*    (2006.01)
*B32B 7/12*     (2006.01)
*B32B 27/28*    (2006.01)

(52) U.S. Cl.
CPC ................. *B32B 15/08* (2013.01); *B32B 7/12* (2013.01); *B32B 27/281* (2013.01); *B32B 27/283* (2013.01); *B32B 2307/546* (2013.01); *B32B 2311/04* (2013.01); *B32B 2386/00* (2013.01); *B32B 2457/00* (2013.01)

(58) Field of Classification Search
CPC ........ B32B 7/12; B32B 27/281; H05K 1/0393
See application file for complete search history.

(56) References Cited

U.S. PATENT DOCUMENTS

2016/0184041 A1   6/2016   Gafford et al.
2017/0319092 A1   11/2017  Wendel-Mitoraj

FOREIGN PATENT DOCUMENTS

| JP | 2008094926 | 4/2008 |
| KR | 20120088243 | 8/2012 |
| WO | WO 2015/020952 | 2/2015 |
| WO | WO 2015/143281 | 9/2015 |

OTHER PUBLICATIONS

Examination Report for Application No. GB 1719697.3, dated Oct. 28, 2020.
"Fabrication of Stretchable and Flexible Electrodes Based on PDMS Substrate," University of Durham, downloaded on Oct. 28, 2020.
English Translation of First Office Action issued in Appl. No. CN201880076475.5 (dated Oct. 27, 2021).
Chou et al., "Largely deformable surface electrode based on PDMS for cortical recording and stimulation," IEEE Proc. Conf, on Neural Engineering, Cancun Mexico, p. 306-310 (Apr.-May 2011).
Yoon et al, "Effects of parylene buffer layer on flexible substrate in organic light emitting diode," Thin Solid Films, 513: 258-263 (2006).
Search Report issued in Appl. No. GB1719697.3 (dated 2019).
Search Report & Written Opinion issued in Appl. No. PCT/GB2018/053417 (dated 2019).

*Primary Examiner* — Elizabeth E Mulvaney
(74) *Attorney, Agent, or Firm* — Barnes & Thornburg LLP

(57) ABSTRACT

A flexible conductive or electronic device comprising a polymer base, a poly-para-xylylene layer which is bonded to the polymer base by a first adhesive layer and a conductive layer which is bonded to the poly-para-xylylene layer by a second adhesive layer.

20 Claims, No Drawings

FLEXIBLE CONDUCTIVE DEVICE

This application is a U.S. national stage application under 35 USC § 371 of PCT Application No. PCT/GB2018/053417, filed on Nov. 27, 2018, which claimed priority from Great Brittan Application No. 1719697.3, filed Nov. 27, 2017, the entirety of which are each fully incorporated by reference herein.

FIELD OF THE INVENTION

This invention pertains generally to the field of flexible conductive and electronic devices, to substrates for use in making flexible conductive and electronic devices, to their use as force sensors and to methods of manufacture.

BACKGROUND OF THE INVENTION

There is considerable development in the field of flexible electronic devices. There remain some significant difficulties, particularly as regards the development of flexible conductive devices that are required to be conformable, such as sensors for soft robotic applications.

Devices having a conductive layer or patterned conductive layer on a polymer substrate suitable for a flexible application tend to suffer from cracking on flexing of the device or thermal expansion and contraction. This results in short lifetimes and/or inconsistent function.

Problem to be Solved by the Invention

There is a need for improvements in flexible and conformable conductive devices, for example for use as force senors.

It is an object of this invention to provide a substrate for use in the manufacture of a flexible conductive device which is durable and effective.

It is an object of this invention to provide a flexible conductive device which has a long lifetime and does not become irreparably damaged during normal use.

SUMMARY OF THE INVENTION

In accordance with a first aspect of the invention, there is provided a flexible conductive or electronic device comprising a polymer base, a poly-para-xylylene layer which is bonded to the polymer base by a first adhesive layer and a conductive layer which is bonded to the poly-para-xylylene layer by a second adhesive layer.

In a second aspect of the invention, there is provided a substrate for use in the manufacture of a flexible conductive or electronic device, the substrate comprising a polymer base and a poly-para-xylylene layer which is bonded to the polymer base by a first adhesive layer.

Advantages of the Invention

The conductive device of the invention provides a flexible and even conformable substrate and a conductive, typically patterned, layer for a functional use such as a force sensor that is robust, survives flexing and thermal expansion and may be incorporated into other substrates for use.

DETAILED DESCRIPTION OF THE INVENTION

The invention provides for an improved flexible conductive or electronic device and to a substrate for making such a device. The substrate according to one aspect comprises a polymer base and a poly-para-xylylene layer which is bonded to the polymer base by a first adhesive layer. Preferably a second adhesive layer is disposed on the poly-para-xylylene layer on the side opposing the side bonded to the polymer base. The flexible conductive device according to another aspect comprises the substrate above having a conductive layer (e.g. a patterned conductive layer) disposed thereon and bonded thereto by a second adhesive layer.

Preferably, the device and substrate are conformable.

The polymer base may be of any suitable base and may comprise one or more of PDMS, PI, polybutyrate, PMMA, acrylate, polyethylene, HDPE, LDPE, PET, TPU, polyurethane, PVC, PEI, PEN, PP, polystyrene, aliphatic or semi-aromatic polyamide, PTFE, PVDF or a blend thereof.

The polymer base preferably comprises and more preferably is a polymer having a Young's modulus of up to 1.5 MPa, more preferably up to 1.2 MPa, still more preferably up to 1 MPa and preferably at least 500 kPa, such as in the range 700 kPa to 1 MPa, e.g. 700 to 800 kPa.

Preferably, the polymer base comprises or is PDMS and/or PI (polyimide), more preferably PDMS (polydimethyl siloxane).

The polymer base may be of any suitable thickness but is preferably thin enough to achieve the desired flexibility or conformity. Preferably, the polymer base has a thickness of up to 1 mm, more preferably from 50 to 500 μm, still more preferably from 60 to 250 μm, such as from 75 to 175 μm.

The first adhesive layer and second adhesive layer can each be any suitable adhesive, preferably a molecular bonding adhesive. This may be a click chemistry bonding material. Preferably the first and/or second adhesive layer comprises a mercaptan, more preferably comprises a mercaptosilane and still more preferably comprises or is (3-mercaptopropyl)trimethoxysilane.

The first adhesive layer and/or the second adhesive layer preferably has a thickness of up to 10 nm and is preferably a monolayer, which may be self-assembling in the case of (3-mercaptopropyl)trimethoxysilane.

Preferably, the poly-para-xylylene layer is a parylene layer, more preferably a parylene-C layer.

The poly-para-xylylene layer preferably has a thickness in the range 10 nm to 10 μm. It may comprise a single layer of poly-para-xylylene or a plurality of two or more layers of poly-para-xylylene bonded together, e.g. 3 layers of from 20 to 100 nm bonded by an adhesive such as the mercaptan adhesive referred to above. Preferably, the poly-para-xylylene layer has a thickness in the range 50 nm to 500 nm.

In the conductive device of the invention, the conductive layer may comprise a graphene, a graphite, a metal oxide, a metal alloy or a metal, which is preferably patterned as required (e.g. by screen printing, photolithography or shadow masking application techniques).

The conductive layer preferably comprises a metal selected from one or more of zinc, aluminium, copper, gold, silver, platinum, chromium, tungsten or titanium. More preferably, the conductive layer comprises gold.

The conductive layer has a thickness of from 20 nm to 250 nm, preferably 50 nm to 100 nm.

The substrate and device as described herein may be manufactured by any suitable method known in the art.

The invention has been described with reference to a preferred embodiment. However, it will be appreciated that variations and modifications can be effected by a person of ordinary skill in the art without departing from the scope of the invention.

The disclosure is further understood with reference to the following numbered paragraphs:

Numbered Paragraph 1: A flexible conductive or electronic device comprising:
a polymer base;
a poly-para-xylylene layer which is bonded to the polymer base by a first adhesive layer; and
a conductive layer which is bonded to the poly-para-xylylene layer by a second adhesive layer.

Numbered Paragraph 2: A flexible device of Numbered Paragraph 1, which is a conformable device.

Numbered Paragraph 3: A flexible device of Numbered Paragraph 1 or Numbered Paragraph 2, wherein the polymer base comprises one or more of PDMS, PI, polybutyrate, PMMA, acrylate, polyethylene, HDPE, LDPE, PET, TPU, polyurethane, PVC, PEI, PEN, PP, polystyrene, aliphatic or semi-aromatic polyamide, PTFE, PVDF or a blend thereof.

Numbered Paragraph 4: A flexible device of any one of Numbered Paragraphs 1 to 3, wherein the polymer base comprises a polymer having a Young's modulus of up to 1.5 MPa.

Numbered Paragraph 5: A flexible device of any one of Numbered Paragraphs 1 to 4, wherein the polymer base has a Young's modulus of up to 1.5 MPa.

Numbered Paragraph 6: A flexible device of any one of the preceding Numbered Paragraphs, wherein the polymer base comprises PDMS and/or PI.

Numbered Paragraph 7: A flexible device of any one of the preceding Numbered Paragraphs, wherein the polymer base comprises PDMS.

Numbered Paragraph 8: A flexible device of any one of the preceding Numbered Paragraphs, wherein the polymer base has a thickness of up to 1 mm.

Numbered Paragraph 9: A flexible device of Numbered Paragraph 8, wherein the polymer base has a thickness of from 50 to 500 µm.

Numbered Paragraph 10: A flexible device of Numbered Paragraph 9, wherein the polymer base has a thickness of from 60 to 250 µm.

Numbered Paragraph 11: A flexible device of Numbered Paragraph 10, wherein the polymer base has a thickness of from 75 to 175 µm.

Numbered Paragraph 12: A flexible device of any one of the preceding Numbered Paragraphs, wherein the first adhesive layer and/or the second adhesive layer comprises a mercaptan.

Numbered Paragraph 13: A flexible device of Numbered Paragraph 12, wherein the first adhesive layer and/or the second adhesive layer comprises a mercaptosilane.

Numbered Paragraph 14: A flexible device of Numbered Paragraph 13, wherein the first adhesive layer and/or the second adhesive layer comprises (3-mercaptopropyl)trimethoxysilane.

Numbered Paragraph 15: A flexible device of any one of Numbered Paragraphs 12 to 14, wherein the first adhesive layer and/or the second adhesive layer has a thickness of up to 10 nm.

Numbered Paragraph 16: A flexible device of any one of the preceding Numbered Paragraphs, wherein the poly-para-xylylene layer is a parylene layer.

Numbered Paragraph 17: A flexible device of Numbered Paragraph 16, wherein the parylene layer is a parylene-C layer Numbered Paragraph 18: A flexible device of any one of the preceding Numbered Paragraphs, wherein the poly-para-xylylene layer has a thickness in the range 10 nm to 10 µm.

Numbered Paragraph 19: A flexible device of Numbered Paragraph 18, wherein the poly-para-xylylene layer comprises a single layer of poly-para-xylylene or a plurality of two or more layers of poly-para-xylylene bonded together Numbered Paragraph 20: A flexible device of any one of the preceding Numbered Paragraphs, wherein the poly-para-xylylene layer has a thickness in the range 50 nm to 500 nm.

Numbered Paragraph 21: A flexible device of any one of the preceding Numbered Paragraphs, wherein the conductive layer comprises a graphene, a graphite, a metal oxide, a metal alloy or a metal.

Numbered Paragraph 22: A flexible device of Numbered Paragraph 21, wherein the conductive layer comprises a metal selected from one or more of zinc, aluminum, copper, gold, silver, platinum, chromium, tungsten or titanium.

Numbered Paragraph 23: A flexible device of Numbered Paragraph 22, wherein the conductive layer comprises gold.

Numbered Paragraph 24: A flexible device of any one of the preceding Numbered Paragraphs, wherein the conductive layer has a thickness of from 20 nm to 250 nm, preferably 50 nm to 100 nm.

Numbered Paragraph 25: A substrate for use in the manufacture of a flexible conductive or electronic device, the substrate comprising:
a polymer base; and
a poly-para-xylylene layer which is bonded to the polymer base by a first adhesive layer.

Numbered Paragraph 26: A substrate of Numbered Paragraph 25, which further comprises disposed on the poly-para xylylene layer a second adhesive layer.

Numbered Paragraph 27: A substrate of Numbered Paragraph 25 or Numbered Paragraph 26, wherein the substrate is for use in manufacturing a flexible conductive or electronic device by deposition of a metal or metal oxide layer by photolithography of shadow mask deposition.

Numbered Paragraph 28: A substrate of any one of Numbered Paragraphs 25 to 27, which is a conformable substrate.

Numbered Paragraph 29: A substrate of any one of Numbered Paragraphs 25 to 28, wherein the polymer base comprises one or more of PDMS, PI, polybutyrate, PMMA, acrylate, polyethylene, HDPE, LDPE, PET, TPU, polyurethane, PVC, PEI, PEN, PP, polystyrene, aliphatic or semi-aromatic polyamide, PTFE, PVDF or a blend thereof Numbered Paragraph 30: A substrate of any one of Numbered Paragraphs 25 to 29, wherein the polymer base comprises a polymer having a Young's modulus of up to 1.5 MPa.

Numbered Paragraph 31: A substrate of any one of Numbered Paragraphs 25 to 30, wherein the polymer base has a Young's modulus of up to 1.5 MPa.

Numbered Paragraph 32: A substrate of any one of Numbered Paragraphs 25 to 31, wherein the polymer base comprises PDMS and/or PI.

Numbered Paragraph 33: A substrate of any one of Numbered Paragraphs 25 to 32, wherein the polymer base comprises PDMS.

Numbered Paragraph 34: A substrate of any one of Numbered Paragraphs 25 to 33, wherein the polymer base has a thickness of up to 1 mm.

Numbered Paragraph 35: A substrate of Numbered Paragraph 34, wherein the polymer base has a thickness of from 50 to 500 µm.

Numbered Paragraph 36: A substrate of Numbered Paragraph 35, wherein the polymer base has a thickness of from 60 to 250 µm.

Numbered Paragraph 37: A substrate of Numbered Paragraph 36, wherein the polymer base has a thickness of from 75 to 175 µm.

Numbered Paragraph 38: A substrate of any one of Numbered Paragraphs 25 to 37, wherein the first adhesive layer and/or the second adhesive layer comprises a mercaptan.

Numbered Paragraph 39: A substrate of Numbered Paragraph 38, wherein the first adhesive layer and/or the second adhesive layer comprises a mercaptosilane.

Numbered Paragraph 40: A substrate of Numbered Paragraph 39, wherein the first adhesive layer and/or the second adhesive layer comprises (3-mercaptopropyl) trimethoxysilane.

Numbered Paragraph 41: A substrate of any one of Numbered Paragraphs 38 to 40, wherein the first adhesive layer and/or the second adhesive layer has a thickness of up to 10 nm.

Numbered Paragraph 42: A substrate of any one of Numbered Paragraphs 25 to 41, wherein the poly-para-xylylene layer is a parylene layer.

Numbered Paragraph 43: A substrate of Numbered Paragraph 42, wherein the parylene layer is a parylene-C layer.

Numbered Paragraph 44: A substrate of any one of Numbered Paragraphs 25 to 43, wherein the poly-para-xylylene layer has a thickness in the range 10 nm to 10 µm.

Numbered Paragraph 45: A substrate of Numbered Paragraph 44, wherein the poly-para-xylylene layer comprises a single layer of poly-para-xylylene or a plurality of two or more layers of poly-para-xylylene bonded together.

Numbered Paragraph 46: A substrate of any one of the preceding Numbered Paragraphs, wherein the poly-para-xylylene layer has a thickness in the range of 50 nm to 500 nm.

The invention claimed is:

1. A flexible conductive or electronic device comprising:
a polymer base;
a poly-para-xylylene layer which is bonded to the polymer base by a first adhesive layer; and
a conductive layer which is bonded to the poly-para-xylylene layer by a second adhesive layer.

2. A flexible device as claimed in claim 1, wherein the polymer base comprises one or more of PDMS, PI, polybutyrate, PMMA, acrylate, polyethylene, HDPE, LDPE, PET, TPU, polyurethane, PVC, PEI, PEN, PP, polystyrene, aliphatic or semi-aromatic polyamide, PTFE, PVDF or a blend thereof.

3. A flexible device as claimed in claim 1, wherein the polymer base comprises PDMS or PI.

4. A flexible device as claimed in claim 1, wherein the polymer base has a thickness of up to 1 mm.

5. A flexible device as claimed in claim 1, wherein the first adhesive layer or the second adhesive layer comprises a mercaptan.

6. A flexible device as claimed in claim 5, wherein the first adhesive layer or the second adhesive layer has a thickness of up to 10 nm.

7. A flexible device as claimed in claim 1, wherein the poly-para-xylylene layer is a parylene layer.

8. A flexible device as claimed in claim 1, wherein the poly-para-xylylene layer has a thickness in the range 10 nm to 10 µm.

9. A flexible device as claimed in claim 8, wherein the poly-para-xylylene layer comprises a single layer of poly-para-xylylene or a plurality of two or more layers of poly-para-xylylene bonded together.

10. A flexible device as claimed in claim 1, wherein the conductive layer comprises a graphene, a graphite, a metal oxide, a metal alloy or a metal.

11. A flexible device as claimed in claim 10, wherein the conductive layer has a thickness of from 20 nm to 250 nm.

12. A substrate for use in the manufacture of a flexible conductive or electronic device, the substrate comprising: a polymer base; and a poly-para-xylylene layer which is bonded to the polymer base by a first adhesive layer.

13. A substrate as claimed in claim 12, which further comprises disposed on the poly-para xylylene layer a second adhesive layer.

14. A substrate as claimed in claim 12, wherein the polymer base comprises one or more of PDMS, PI, polybutyrate, PMMA, acrylate, polyethylene, HDPE, LDPE, PET, TPU, polyurethane, PVC, PEI, PEN, PP, polystyrene, aliphatic or semi-aromatic polyamide, PTFE, PVDF or a blend thereof.

15. A substrate as claimed in claim 12, wherein the polymer base comprises PDMS or PI.

16. A substrate as claimed in claim 12, wherein the polymer base has a thickness of up to 1 mm, preferably from 50 to 500 µm.

17. A substrate as claimed in claim 12, wherein the first adhesive layer or the second adhesive layer comprises a mercaptan.

18. A substrate as claimed in claim 12, wherein the first adhesive layer or the second adhesive layer has a thickness of up to 10 nm.

19. A substrate as claimed in claim 12, wherein the poly-para-xylylene layer is a parylene layer.

20. A substrate as claimed in claim 12, wherein the poly-para-xylylene layer has a thickness in the range 10 nm to 10 µm.

* * * * *